(12) United States Patent
Kimura et al.

(10) Patent No.: US 11,443,154 B2
(45) Date of Patent: Sep. 13, 2022

(54) CODE, INFORMATION PROCESSING SYSTEM, AND INFORMATION PROCESSING DEVICE

(71) Applicant: HITACHI, LTD., Tokyo (JP)

(72) Inventors: Yoshiharu Kimura, Tokyo (JP); Shigetaka Tsubouchi, Tokyo (JP); Kota Otake, Tokyo (JP); Masahiro Kawasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/169,802

(22) Filed: Feb. 8, 2021

(65) Prior Publication Data

US 2021/0303958 A1  Sep. 30, 2021

(30) Foreign Application Priority Data

Mar. 25, 2020 (JP) .............................. JP2020-053889

(51) Int. Cl.
*G06K 19/06* (2006.01)
*G06K 1/12* (2006.01)
*B41M 3/14* (2006.01)

(52) U.S. Cl.
CPC ....... *G06K 19/06046* (2013.01); *B41M 3/142* (2013.01); *G06K 1/121* (2013.01); *G06K 19/06037* (2013.01)

(58) Field of Classification Search
CPC ........ G06K 19/00; G06K 19/04; G06K 19/06; G06K 19/06046; G06K 19/06037
USPC ............... 235/494, 487, 375, 462.09, 462.01
See application file for complete search history.

(56) References Cited

U.S. PATENT DOCUMENTS

| 6,070,805 A | * | 6/2000 | Kaufman | G06K 7/14 235/494 |
| 7,050,195 B1 | | 5/2006 | Jones | |
| 9,734,443 B2 | | 8/2017 | Hosokane | |
| 2015/0199600 A1 | * | 7/2015 | Wu | G06K 19/06075 235/494 |

FOREIGN PATENT DOCUMENTS

| CN | 208689827 U | * | 4/2019 | ............... B32B 7/00 |
| JP | 2019-175033 A | | 10/2019 | |
| JP | 2021093028 A | * | 6/2021 | |

OTHER PUBLICATIONS

Office Action issued in Indian Patent Application No. 202114004654 dated Feb. 15, 2022, with English Translation.

* cited by examiner

*Primary Examiner* — Edwyn Labaze
(74) *Attorney, Agent, or Firm* — Foley & Lardner LLP

(57) ABSTRACT

Disclosed is a mechanically readable code including a first area comprising multiple first unit cells and including an information region where information was recorded and a second area including multiple second unit cells including an allochroic cell that changes in color depending on a physical quantity. The multiple first unit cells include transitional color cells having any transitional color in the process of color change of the allochroic cell.

5 Claims, 6 Drawing Sheets

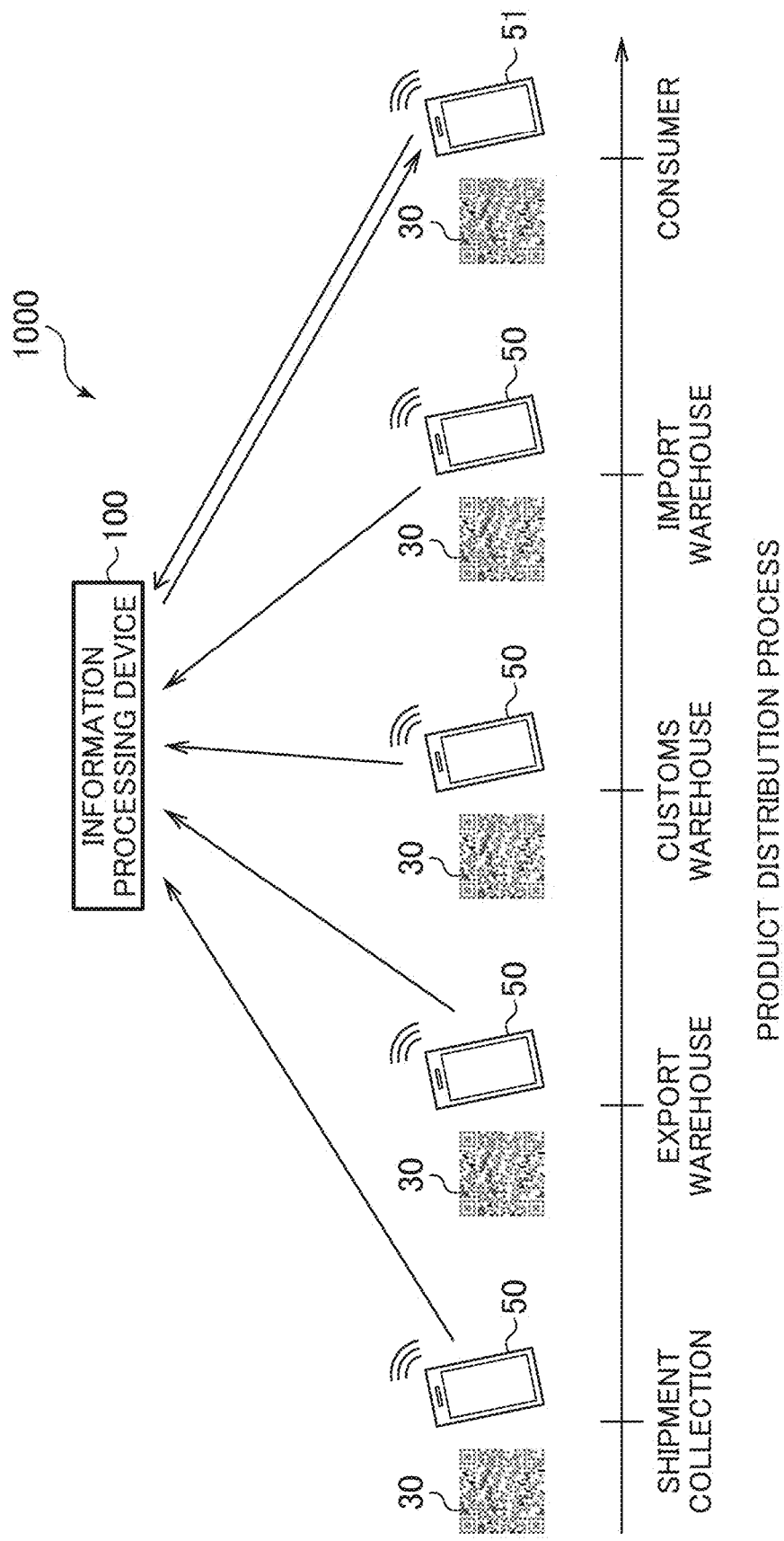

CODE, INFORMATION PROCESSING SYSTEM, AND INFORMATION PROCESSING DEVICE

CROSS-REFERENCE TO RELATED APPLICATION

The present application is based on, and claims priority from, Japanese application No. 2020-053889, filed Mar. 25, 2020, the disclosure of which is hereby incorporated by reference herein in its entirety.

BACKGROUND

Technical Field

The present invention relates to a code, an information processing system, and an information processing device.

RELATED ART

A technology for presuming an environment to which a code such as a two-dimensional bar code has been exposed is known. In Patent Literature (PTL) 1, described is an information code that is formed by printing multiple diversified cells so as to arrange these cells within a code area; the information code is characterized in that the code area is internally provided with a specific pattern region where a specific pattern having a predetermined form is disposed, a data recording region where given data is recorded by the multiple diversified cells, and an error-correcting code recording region where an error-correcting code is recorded by the multiple diversified cells and ink for printing cells arranged within a predetermined error-correctable range among the cells arranged within the code area changes in color depending on a predetermined condition, as compared to ink for printing the remaining cells. Patent Literature 1 (Japanese Unexamined Patent Application Publication No. 2019-175033) discloses one example of this technology.

SUMMARY

The code according to the technology described in Patent Literature 1 is configured to change in color affected by ambient temperature and its color change is easy to cognize visually. Therefore, it can easily be perceived that a predetermined condition of an ambient environment or the like has changed just by looking at the information code. Nevertheless, a consumer such as an end user could feel odd upon viewing the code that changed in color.

The present invention addresses providing a code that hardly makes a user feel odd when looking at the code and allows the user to perceive that an ambient physical quantity has changed and its related information processing system and information processing device.

A code of the present invention resides is a mechanically readable code comprising a first area comprising multiple first unit cells and including an information region where information was recorded and a second area comprising multiple second unit cells including an allochroic cell that changes in color depending on a physical quantity. The multiple first unit cells include transitional color cells having any transitional color in the process of color change of the allochroic cell. Other solutions will be described later in Description of Embodiments.

According to the present invention, it is possible to provide a code that hardly makes a user feel odd when looking at it and allows the user to perceive that an ambient physical quantity has changed and its related information processing system and device.

BRIEF DESCRIPTION OF DRAWINGS

FIG. 5 is a diagram explaining an overview of an information processing system according to an embodiment herein.

DESCRIPTION OF EMBODIMENT

The present invention will be described hereinafter. The invention is not limited to what will be described hereinafter and can be modified and implemented without impairing its advantageous effects significantly. It is possible to implement the invention by combining different embodiments. In the following description, identical members in different embodiments are assigned identical reference signs and their duplicated description is dispensed with.

Figure 1:
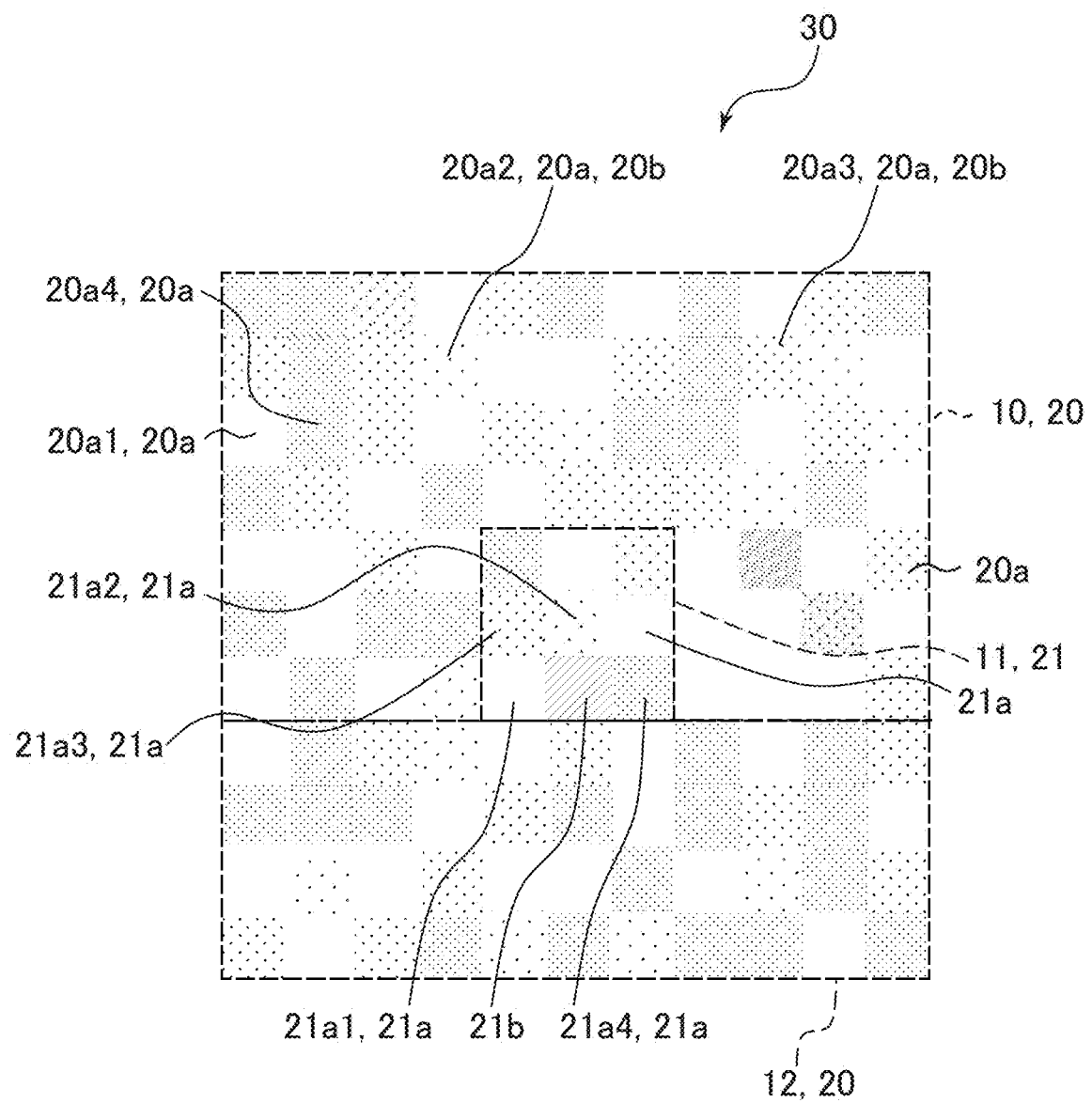
FIG. 1 is a schematic diagram of a code according to an embodiment herein.

FIG. 1 is a schematic diagram of a code 30. Although the code 30 is formed in conformity with a predefined standard (which will be mentioned later), the code is depicted in FIG. 1 in no conformity with the predefined standard for the sake of simplifying the depiction. The code 30 is chromatic, particularly colored in blue, for example, and is displayed on, e.g., a product (not depicted) having, e.g., a white ground color. In an example depicted, grids of dots are used to represent a blue color. For instance, a low-density grid of dots represents light blue, a medium-density grid of dots represents moderately dark blue, and a high-density grid of dots represent darkest blue. A white color within an area surrounded by broken lines is the ground color. The code 30 can be displayed by printing with, e.g., a blue ink. Note that the code 30 may be monochrome.

The code 30 is a mechanically readable code. That is, its image can be captured by an imaging device such as, e.g., an optical camera, a digital camera, or an optical reader. The code 30 can be one of types including, e.g., one-dimensional barcode and two-dimensional barcode such as a QR code (registered trademark).

The cord 30 is the one created according to a predefined standard that defines at least an information region 10 where information was recorded and a non-use region 11 that is not used for reading information. Owing to this, an allochroic cell 21b (which will be described later) can be disposed in the non-use region 11 without affecting recorded information. For one-dimensional barcode, the predefined standard is, e.g., ISO/IEC 15420:2000; for two-dimensional barcode (e.g., a QR code), the predefined standard is, e.g., ISO/IEC 18004.

The code 30 is configured including a first area 20 that is comprised of multiple first unit cells 20a and includes the information region 10 where information was recorded and a second area 21 that is comprised of multiple second unit cells 21a including the allochroic cell 21b that changes in color depending on a physical quantity. The second area is contained in the above-mentioned non-use region 11. Of those mentioned above, the first area 20 includes the information region 10 occupying an upper part of the code 30 and an error correction region 12 occupying a lower part thereof and covers an area outside the second area 21 (contained in the non-use region 11) that lies in the center of the code 30. Note that, although the second area 21 is positioned in the center of the code 30, the second area is not necessarily disposed in the center and can be disposed in a non-use region defined according to a predefined standard.

Both the first unit cells 20a and the second unit cells 21a are substantially square; i.e., one first unit cell 20a and one second unit cell 21a have a substantially square shape formed with one or multiple printed dots. A multiple number of first unit cells 20a and second unit cells 21a are arranged in each of vertical and horizontal directions. In the depicted example, 11 pieces of first unit cells 20a are arranged in a vertical direction and 11 pieces of these cells are arranged in a horizontal direction. Three pieces of second unit cells 21a are arranged in the vertical direction and three pieces of these cells are arranged in the horizontal direction.

The first area 20 may include the error correction region 12 for recovering information in the information region 10 in case of corruption of the code 30 in addition to the information region 10. Also, the second area 21 is contained in the non-use region 11. Owing to the fact that the second area 21 is contained in the non-use region 11, it can be ensured that color change of the allochroic cell 21b (which will be described later), even when occurring, will not affect information in the information region 10.

Information recorded in the first area can be one of those including, e.g., a URL, a serial number unique to each code 30, etc. Besides, a physical quantity can be one of those including, e.g., temperature, humidity, light, gas concentration, vibration, etc.

The allochroic cell 21b is formed with an ink that changes in color depending on a physical quantity. For example, the allochroic cell 21b is colored darker if the physical quantity increases and colored lighter if the physical quantity decreases. In the present embodiment, the allochroic cell 21b undergoes color change depending on an integral physical quantity that is a product of a physical quantity further multiplied by elapsed time in order to make the physical quantity influencing the product quality perceptible. Color change of the allochroic cell 21b is described with reference to FIG. 2.

Figure 2:
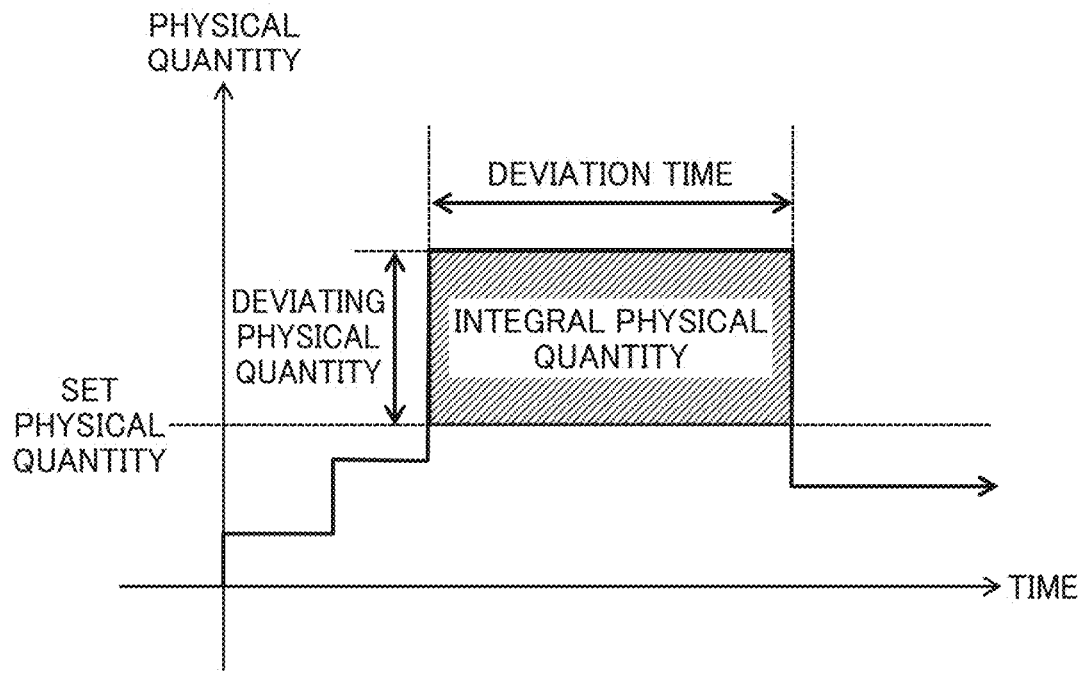
FIG. 2 is a diagram explaining color change of an allochroic cell.

FIG. 2 is a conceptual diagram explaining color change of the allochroic cell 21b. When the physical quantity exceeds a set physical quantity, color change begins and the color change stops at a time when the physical quantity has become below the set physical quantity. A deviation from the set physical quantity is taken as a "deviating physical quantity" and a time period during which the deviating physical quantity occurs is taken as a "deviation time". The larger the deviating physical quantity or the longer the deviation time, the amount of color change of the allochroic cell 21b will become larger. Therefore, the larger the area of a rectangle denoting the integral physical quantity shaded in FIG. 2 (=deviation time×deviating temperature), the amount of color change of the allochroic cell 21b will become larger. By using this integral physical quantity as the physical quantity, it is possible to make the physical quantity influencing the product quality perceptible.

For an ink that changes in color depending on magnitude of temperature, for example, an inorganic thermo chromic material consisting of a metal complex salt or an organic material such as a leuco dye and a thermo chromic liquid crystal can be used. It is preferable to use an ink including a leuco dye that changes in color depending on the product of temperature and elapsed time among those mentioned above as well as a developer and a decolorant.

As a leuco dye, an electron-donating compound that produces a color by reacting with an electron-accepting developer can be used. Such a compound that can be used is, for example, a compound containing any of the following substances: Triphenyl methane phthalide, Fluoran, Phenothiazine, Indrill phthalide, Leuco auramin, Spiropyran, Rhodamine lactam, Triphenyl methane, Triazene, Spirophthalan xanthene, Naphtholactam, Azimethie, etc.

For a developer, an electron-accepting compound that changes the molecular structure of a lueco dye by reacting with an electron-donating lueco dye can be used. As a concrete example of a developer, any of the following substances can be used: 4-Hydroxybenzoic acid benzyl, 2, 2'-Biphenol, 1, 1-Bis (3-cyclohexyl-4-hydroxyphenyl) cyclohexane, 2, 2-Bis (3-cyclohexyl-4-hydroxyphenyl) propane, Bisphenol A, Bisphenol F, Bis (4-hydroxyphenyl) sulfide, 1, 1-Bis (4-hydroxyphenyl) cyclohexane, 1, 1-Bis (4-hydroxyphenyl-3-methylphenyl) cyclohexane, α, α, α'-Tris (4-hydroxyphenyl)-1-ethyl-4-isopropyl benzene, etc.; besides, Paraoxybenzoic acid ester, Phenols such as gallic acid esters, Metal salt of carboxylic acid derivative, Salicylic acid and Salicylic acid metal salt, Sulfonic acids, Sulfonates, Phosphoric acids, Phosphate metal salts, Acidic phosphate esters, Acidic phosphate ester metal salts, Phosphorous acids, Phosphorous acid metal salts, etc.

A decolorant is an additive agent that decolors a leuco dye. As a decolorant, a compound that dissociates the bond between a leuco dye and a developer can be used. As a decolorant, such a compound is preferable that does not develop a color in reaction with a leuco dye and has polarity enough to dissolve a leuco dye and a developer. Such a decolorant can be any of the following substances: Hydroxy compound, Ester compound, Peroxy compound, Carbonyl compound, Aromatic compound, Aliphatic compound, Halogen compound, Amino compound, Imino compound, N-oxide compound, Hydroxylamine compound, Nitro compound, Azo compound, Diazo compound, Azide compound, Ether compound, Oils and fats, Sugar, Peptide, Nucleic acid, Alkaloid, Steroid, etc.

Returning to FIG. 1, the multiple first unit cells 20a include transitional color cells 20b having any transitional color in the process of color change of the allochroic cell 21b. A case where the allochroic cell 21b was arranged to be colored with an ink such that coloring density increases, as an integral physical quantity increases is described below by way of example. When the allochroic cell 21b changes in color from white to dark blue, the transitional color cells 20b are, e.g., watery blue (light blue). A description is made with reference to FIG. 3.

Figure 3:
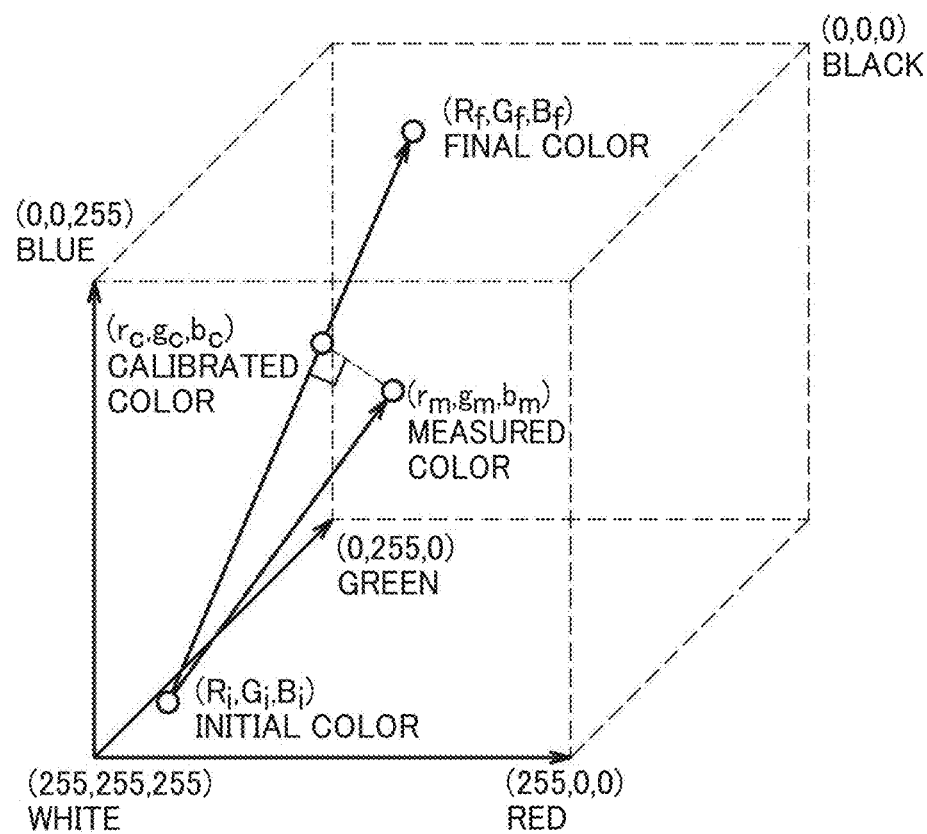
FIG. 3 is a diagram explaining a transitional color.

FIG. 3 is a diagram explaining a transitional color. Final color and measured color vectors from an initial color assumed as an origin are expressed in Equation (i) and Equation (ii).

$$\text{Final color } (R,G,B) = (R_f - R_i, G_f - G_i, B_f - B_i) \qquad \text{Equation (i)}$$

$$\text{Measured color } (r,g,b) = (r_m - R_i, g_m - G_i, b_m - B_i) \qquad \text{Equation (ii)}$$

Lengths of the vectors from the initial color to the final color and to the measured color (an absolute value of R and an absolute value of r, respectively) according to Formula (i) and Formula (ii) are expressed in Formula (iii) and Formula (iv).

[Formula 1]

$$|R|=\sqrt{R^2+G^2+B^2} \quad \text{Equation (iii)}$$

$$|r|=\sqrt{r^2+g^2+b^2} \quad \text{Equation (iv)}$$

Length to a calibrated color ($r_c$, $g_c$, $b_c$) point on the vector of Equation (i) with a perpendicular line being drawn from the measured color ($r_m$, $g_m$, $b_m$) point to the vector is expressed in Equation (v).

[Formula 2]

$$|r||R|\cos\theta/|R|=|r|\cos\theta \quad \text{Equation (v)}$$

An inner product of the vectors of Equation (iii) and Equation (iv) is expressed in Equation (vi).

[Formula 3]

$$|r||R|\cos\theta=\sqrt{r^2+g^2+b^2}\sqrt{R^2+G^2+B^2}\cos\theta=rR+gG+bB \quad \text{Equation (vi)}$$

A ratio between the vector length (Equation (iii) above) from the initial color to the final color and the vector length (Equation (iv) above) from the initial color to the calibrated color is calculated in such a way that Equation (v) and Equation (vi) are substituted into Equation (iii) and Equation (iv) and Equation (iv) is calculated.

[Formula 4]

$$\frac{|r|\cos\theta}{|R|}\times 100 = \frac{\sqrt{r^2+g^2+b^2}\cos\theta}{\sqrt{R^2+G^2+B^2}}\times 100 = \frac{\sqrt{r^2+g^2+b^2}}{\sqrt{R^2+G^2+B^2}}\times\frac{rR+gG+bB}{\sqrt{r^2+g^2+b^2}\sqrt{R^2+G^2+B^2}}\times 100 = \frac{rR+gG+bB}{R^2+G^2+B^2}\times 100 \quad \text{(vii)}$$

Equation (vii) is defined herein as coloring density. A transitional color is any color of which the coloring density that is calculated by Equation (vii) is more than 0% and less than 100%. It is defined that the larger the coloring density, the color is darker; the smaller the coloring density, the color is paler (lighter). When the allochroic cell 21b changes in color from white to dark blue as above, the white color density is expressed as ($R_i$, $G_i$, $G_i$) and the dark blue color density is expressed as ($R_f$, $G_f$, $G_f$). Therefore, the transitional color cells 20b are colored in any transitional color of which the coloring density that is calculated by Equation (vii) is more than 0% and less than 100%.

A decision as to whether or not a color is a transitional color can be made by measuring R, G, and B of the allochroic cell 21b, thus determining the measured color and analyzing the ink to display the allochroic cell 21b, thus determining a color changing component and a color changing process attributed to the component.

Returning to FIG. 1, the proportion of an area occupied by the second area 21 is equal to or less than 30% of the entire area of the code 30. By shrinking the area occupied by the second area 21, the allochroic cell 21b can be made hard to recognize. Besides, the proportion of an area occupied by the allochroic cell 21b is equal to or less than 10% of the entire area of the code 30. By shrinking the area occupied by the allochroic cell 21b, the allochroic cell 21b can be made hard to recognize. In a case where there are multiple allochroic cells 21b, it is preferable that their occupation area is equal to or less than 10% of the entire area of the code 30. Besides, in the case where there are multiple allochroic cells 21b, it is preferable that the multiple allochroic cells 21b are formed so as to be spaced from each other. Thereby, color change of the allochroic cell 21b can be made hardly noticeable.

It is preferable that the first unit cells 20a are colored with two or more colors. That is, although the first unit cells 20a are unicolored, there are two or more differently colored groups of the first unit cells 20a (i.e., they are colored with two or more colors with focusing on color) and these cells are colored with four colors in the depicted example. By thus increasing the colors of the first unit cells 20a, the allochroic cell 21b can be made hardly noticeable. Above all, the information region 10 is comprised of the first unit cells 20a colored with two or more colors, one of which is a transitional color. Preferably, the information region 10 is comprised of the first unit cells 20a colored with three or more colors, two or more of which are transitional colors.

In the depicted example, the information region 10 is comprised of the first unit cells 20a colored with four colors, two of which are transitional colors. Specifically, the first unit cells 20a include first unit cells 20a1 colored with white, first unit cells 20a2 with a grid of dots corresponding to a transitional color, first unit cells 20a3 with a high-density grid of dots corresponding to a transitional color, and first unit cells 20a4 with a higher-density grid of dots corresponding to dark blue. Among these colors, white is the same as the ground color that is the initial color of the allochroic cell 21b. Dark blue is the final color of the allochroic cell 21b. Transitional colors are colors between the initial color and the final color as described previously and the transitional color cells 20b include the first unit cells 20a2 and 20a3. The first unit cells 20a are colored as above and, thereby, the allochroic cell 21b can be made hardly noticeable.

The second unit cells 21a include second unit cells 21a (cells) not changing in color depending on a physical quantity. It is preferable that the second unit cells 21a not changing in color depending on a physical quantity are second unit cells 21a colored the same as the color of any of the first unit cells 20a. In the depicted example, the second area 21 includes second unit cells 21a1, 21a2, 21a3, 21a4 colored the same as the colors of the first unit cells 20a1, 20a2, 20a3, 20a4, respectively. In fact, the first unit cells 20a1 and second unit cells 21a1 are colored with the same color, the first unit cells 20a2 and a second unit cells 21a2 are colored with the same color, the first unit cells 20a3 and second unit cells 21a3 are colored with the same color, the first unit cells 20a4 and second unit cells 21a4 are colored with the same color. This enables it to surround the allochroic cell 21b by the first unit cells 20a and the second unit cells 21a colored the same as the colors of the first unit cells 20a and the allochroic cell 21b can be made hardly noticeable.

Above all, in the second area 21, there are two or more second unit cells 21a colored the same as the colors of the first unit cells 20a; there are eight cells other than the allochroic cell 21b in the depicted example. By thus increasing the number of the second unit cells 21a colored with the same colors, the allochroic cell 21b can be made more hardly noticeable. Besides, the second unit cells 21a (cells) not changing in color depending on a physical quantity are colored with two or more colors; four colors in the depicted example. By thus increasing the colors of the second unit cells 21a, the allochroic cell 21b can be made more hardly noticeable.

It is preferable that the first unit cells 20a and second unit cells 21a are colored with homogenous colors. The homogenous colors termed herein are a combination of colors that differ only in brightness, chroma, or contrasting density and a combination of colors in the same hue with different tones. Each and any of the first unit cells 20a and second unit cells 21a are colored with an isochromatic color, but differing in contrasting density. A degree of contrasting density can be determined according to magnitude of coloring density calculated by Equation (vii) given previously. Thereby, the whole of first unit cells 20a and second unit cells 21 can be represented in a similar hue and the allochroic cell 21b can be made even more hardly noticeable.

Figure 4A:
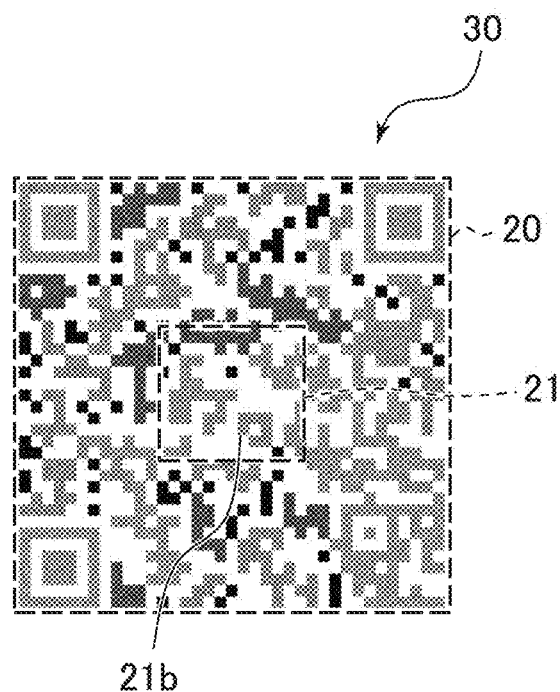
FIG. 4A is the appearance of the code before exposure to a physical quantity change.
Figure 4B:
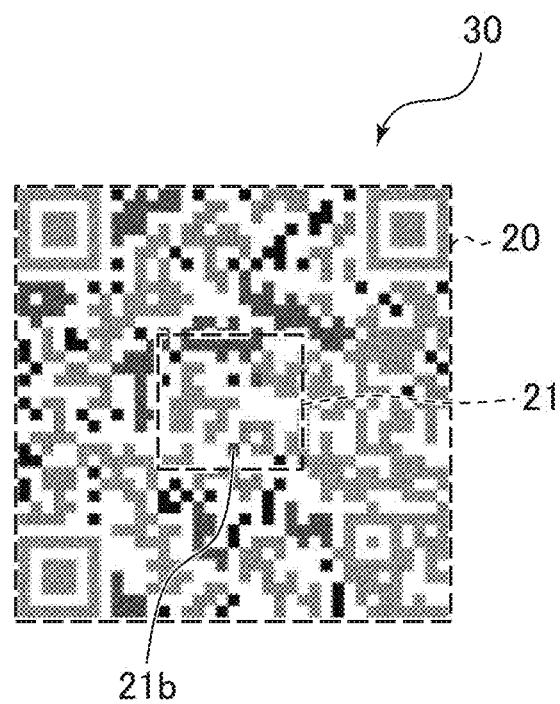
FIG. 4B is the appearance of the code after exposure to a physical quantity change.

FIG. 4A is the appearance of the code 30 before exposure to a physical quantity change. Likewise, FIG. 4B is the appearance of the code 30 after exposure to a physical quantity change. FIG. 4A and FIG. 4B depict a QR code as an example. For instance, in a factory or the like, the code 30 depicted in FIG. 4A is displayed on a product (not depicted). In an example of FIG. 4A, the allochroic cell 21b is white, the same color as the ground color. The product with the code 30 displayed thereon is exposed to various physical quantities until it has reached a consumer. For this reason, the ink that forms the allochroic cell 21b undergoes color change depending on a physical quantity and the cell is colored accordingly in the depicted example. Thereby, the allochroic cell 21 becomes visible, as depicted in FIG. 4B, and it can be perceived that the physical quantity has changed.

By virtue of the code 30, even when the allochroic cell 21b changes in color, its color change is hardly noticeable and hardly makes a user feel odd when looking at the code. Besides, because the allochroic cell 21b changes in color depending on a physical quantity change to which the code 30 has been exposed, the physical quantity to which the code 30 has been exposed is perceivable based on the color of the allochroic cell 21b.

FIG. 5 is a diagram explaining an overview of an information processing system 1000 in the present embodiment. FIG. 5 illustrates an example of international distribution involving import/export of products; however this system can be applied to domestic distribution in which a chain from production to a consumer is completed in a country. The information processing system 1000 enables a physical quantity in the distribution process of, e.g., a product such as wine to be perceived by a customer who received the product. For instance, if the product is wine, the code 30 is displayed, inter alia, on a label attached to a wine bottle or a box containing a wire bottle.

The information processing system 1000 includes a terminal device 50 having a reader (an imaging device such as, e.g., a camera) to mechanically read information of the code 30 and an information processing device 100. A concrete configuration of the information processing device 100 will be described later with reference to FIG. 6. The terminal device 50 is a terminal having an image capturing function, e.g., an information communication terminal. The terminal device 50 is used to upload read information during distribution of the product with the code 30 displayed thereon to the information processing device 100. This enables the information processing device 100 to determine whether the allochroic cell 21b has changed in color during distribution of the product.

At the time of shipment collection of the product, a person in charge of transporting the product (e.g., a driver) takes an image of the code 30 using the terminal device 50. Then, read information including the image of the code 30 is uploaded to the information processing device 100. Based on the code 30, a temperature and an integral physical quantity (FIG. 2) at the reading are determined, which will be detailed later. At the same time, a time and a position when and where the image was taken are also uploaded as the read information.

Similarly, a person in charge at an export warehouse, a customs warehouse, and an import warehouse, takes an image of the code 30 displayed on the product using the terminal device 50. Thereby, each of read information is uploaded to the information processing device 100. Then, based on the uploaded read information, the information processing device 100 determines a physical quantity to which the produce has been exposed. A concrete determination method will be described later with reference to FIG. 6.

A consumer who received the product will only recognize the code 30 as a straightforward code, because the allochroic cell 21b is hardly noticeable. When the consumer takes an image of the code 30 displayed on the product by a consumer terminal 51 (e.g., a terminal having an image capturing function), for example, a URL recorded in the code 30 is displayed on the consumer terminal 51. By accessing the displayed URL, the consumer can know the physical quantity associated with the product determined by the information processing device 100. However, the consumer may not want to know an actual value itself of the physical quantity. Therefore, based on the physical quantity to which the product has been exposed, an indication as to whether or not the product with the code 30 displayed thereon has been distributed in a proper condition may be given to the customer.

Figure 6:
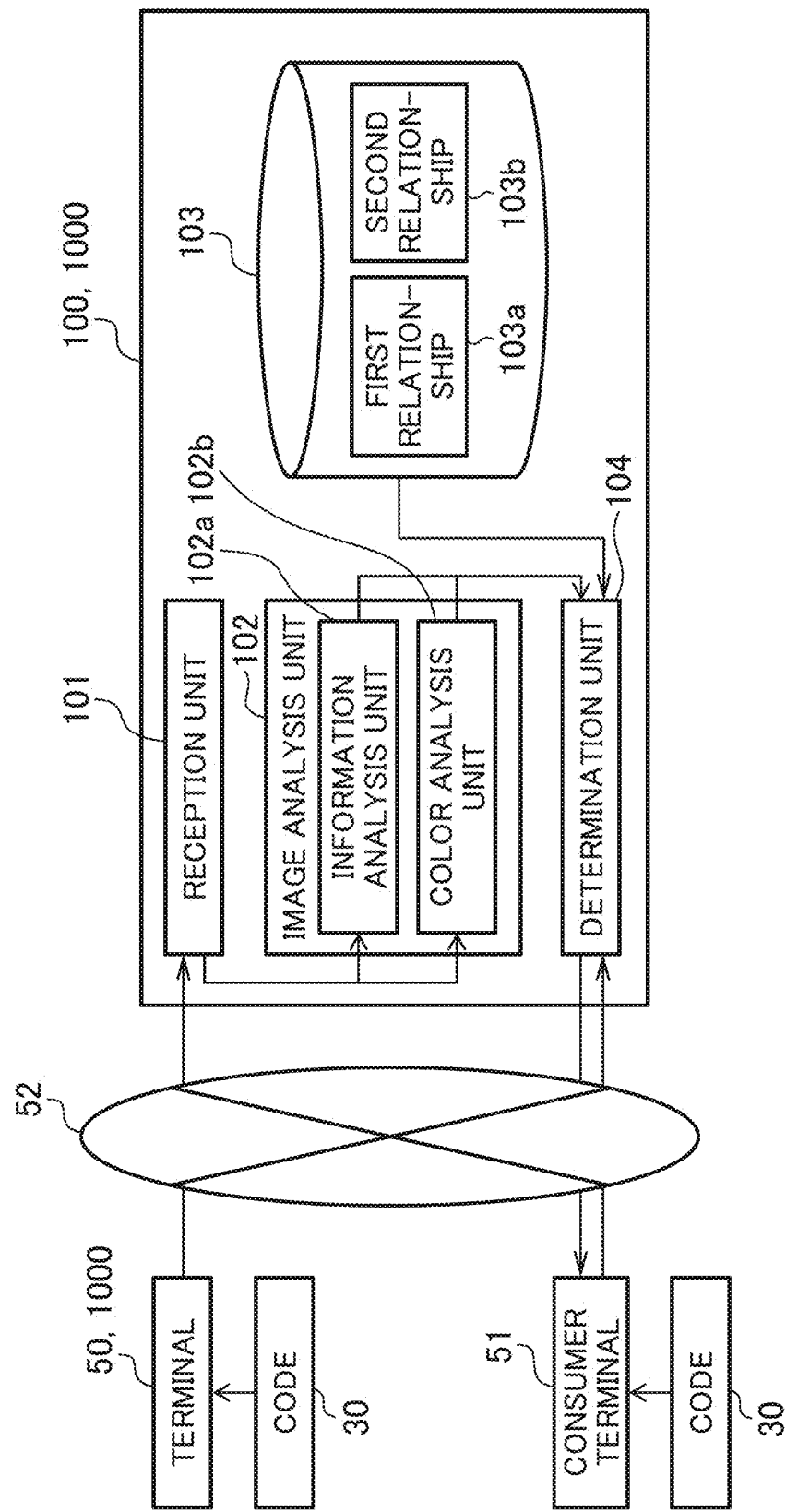
FIG. 6 is a block diagram of the information processing system including an information processing device.

FIG. 6 is a block diagram of the information processing system 1000 including the information processing device 100. The information processing device 100 is configured, equipped with, inter alia, e.g., a CPU (Central Processing Unit), a RAM (Random Access Memory), a ROM (Read Only Memory), an HDD (Hard Disk Drive), and an I/F (interface), each of which is not depicted. The information processing device 100 is embodied in such a manner that a predefined control program being stored in the ROM is executed by the CPU.

The information processing device 100 is a device that processes information described in the code 30 and is equipped with a reception unit 101, an image analysis unit 102, a database 103, and a determination unit 104.

The reception unit 101 receives information acquired by a terminal device 50 and color information of the allochroic cell 21b via the Internet 52. Information acquired by a terminal device 50 is, for example, acquired image data of the code and read information. In an alternative embodiment, the reception unit 101 receives information acquired by a terminal device 50 and image data of the allochroic cell 21b via the Internet 52. Hence, the reception unit 101 receives information recorded in the code 30 and color information of the allochroic cell 21b or image data of the allochroic cell 21b.

The image analysis unit 102 analyzes the acquired image of the code 30. The image analysis unit 102 is equipped with an information analysis unit 102a and a color analysis unit 102b.

The information analysis unit 102a determines information recorded in the information region 10 within the code 30. The information includes a URL, a serial number unique to each code 30, etc., as mentioned previously. The determined information is output to the determination unit 104.

The color analysis unit 102a determines the color of the allochroic cell 21b. The color that is determined is quantified and separated into R, G, and B components. The position of the allochroic cell 21b may be determined by comparing between acquired images or may be pre-recorded in the information region 10. The determined color is output to the determination unit 104.

Although the description provided in the present embodiment assumes a case where the information processing device 100 is equipped with the image analysis unit 102, the terminal device 50 may be equipped with the image analysis unit 102. In a case where the terminal device 50 is equipped with the image analysis unit 102, the terminal device 50 transmits information described in the code 30 and color information of the allochroic cell 21b to the reception unit of the information processing device 100. The reception unit 101 receives the information described in the code 30 and the color information of the allochroic cell 21b.

The database 103 retains relationships including a first relationship 103a between the color of the allochroic cell 21b and a physical quantity and a second relationship 103b between information acquired by the terminal device 50 and a type of ink to color the allochroic cell 21b. In an alternative embodiment, the database 103 retains relationships including the first relationship 103a and a second relationship (not depicted) between information acquired by the terminal device 50 or the code 30 and a type of ink to color the allochroic cell 21b. In an example depicted, a physical quantity is an integral physical quantity that is a product of a physical quantity and elapsed time, as an example, as noted previously. Elapsed time can be an amount of time elapsed from when the code was last read. By using the integral physical quantity, it is possible to determine a physical quantity change that may influence the product during the distribution process.

Figures 7, 8:
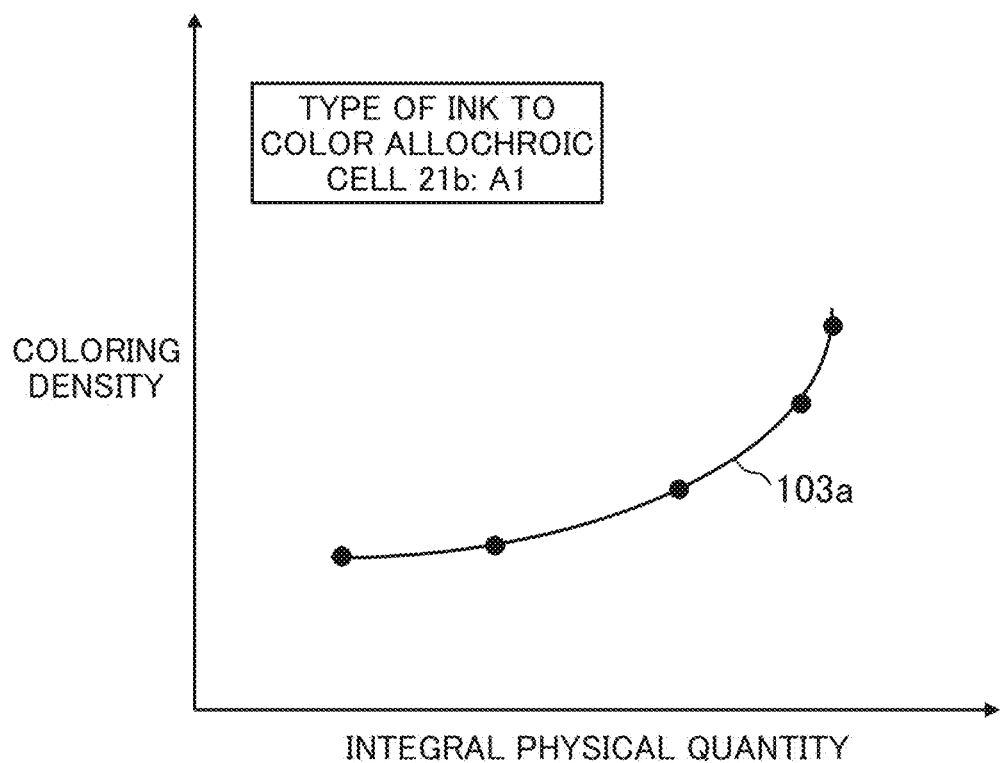
FIG. 7 is a schematic graphical diagram of a first relationship retained in a database.
FIG. 8 is a schematic tabular diagram of a second relationship retained in the database.

FIG. 7 is a schematic graphical diagram of a first relationship 103a retained in the database 103. First relationships 103a are retained by each type of ink to color the allochroic cell 21b. Thereby, a physical quantity can be determined from coloring density that differs depending on type of ink even for the same physical quantity. By way of example, a first relationship 103a in a case where the type of ink (e.g., a coloring component) to color the allochroic cell 21b is A1 is graphed in the diagram. Also, the aforementioned integral physical quantity is plotted as the physical quantity. In an example presented in the diagram, coloring density calculated by Equation (vii) given previously is used to represent the color of the allochroic cell 21b. Note that representation of a first relationship 103a is not limited to the example presented in the diagram and may be, for example, in a table or the like.

The larger the integral physical quantity, the coloring density becomes larger. Hence, the longer the time during which the code 30 is exposed to high temperature, the coloring density of the allochroic cell 21b changes to a greater extent. For instance, in a case where the product is wine, its quality is almost unchanged even when it is momentarily exposed to high temperature. Nevertheless, when it is exposed to equally high temperature for a long time, its quality deteriorates. Therefore, by determining the integral physical quantity based on the color of the allochroic cell 21b, it is possible to perceive the physical quantity influencing the quality, for example, indicating circumstances that the product has been exposed to high temperature for a long time.

FIG. 8 is a schematic tabular diagram of a second relationship 103b retained in the database 103. Note that representation of a second relationship 103b is not limited to an example presented in the diagram. As an example, serial IDs unique to each code 30 recorded in the information region 10 are presented in FIG. 8.

The second relationship 103b associates the serial IDs with the types of ink to color the allochroic cell 21b. This makes it possible to identify the serial ID of the code 30 whose image was taken and identify the type of ink to color the allochroic cell 21b based on the identified serial ID. By identifying the type of ink, it is possible to determine a physical quantity using an appropriate first relationship 103a (FIG. 7).

Returning to FIG. 6, the determination unit 104 determines a physical quantity (e.g., an integral physical quantity) to which the code 30 has been exposed, based on the received information, the color of the allochroic cell 21b, and the relationships retained in the database 103 (first relationship 103a and second relationship 103b). In an alternative embodiment, the determination unit 104 identifies the color of the allochroic cell 21b from the received image data of the allochroic cell 21b and determines a physical quantity to which the code 30 has been exposed, based on the received information, the identified color of the allochroic cell 21b, and the relationships retained in the database 103.

The determination unit 104 determines the type of ink to color the allochroic cell 21b from the read serial ID and the second relationship 103b. Further, the determination unit 104 determines the first relationship 103a corresponding to the determined ink to color the allochroic cell 21b. The determination unit 104 determines a physical quantity to which the code 30 has been exposed, based on the determined first relationship 103a and the actual color (e.g., of coloring density) of the allochroic cell 21b.

For instance, in a case where the product is wine, assume that, temperature determined from the code 30, e.g., at the time of shipment collection was 22° C. and temperature determined from the code 30, e.g., at an export warehouse was 17° C. In this case, at each time of reading the code in environments of, at least, the shipment collection and the export warehouse, it can be said that the product was placed in a proper temperature range. Nevertheless, from only these pieces of information, a physical quantity on the way between the shipment collection and the export warehouse cannot be known.

Therefore, in the present embodiment, an integral physical quantity is used as a physical quantity. Because of this, it is possible to determine an integral physical quantity on the way between the shipment collection and the export warehouse from the color of the allochroic cell 21b at the time of shipment collection, the color of the allochroic cell 21b at the export warehouse, and the database 103. In consequence, by comparing the integral physical quantity with a threshold of integral physical quantity influencing the quality of wine, it is possible to perceive, e.g., possibility of change in the quality of wine on the way between the shipment collection and the export warehouse. This enables it to give the customer an indication as to whether or not the product has been distributed in a condition in which its quality is controlled properly. Note that, although an integral physical quantity is used as a physical quantity in the present embodiment, a physical quantity may be used instead of an integral physical quantity.

By reading the code 30 on the product using the consumer terminal 51, the customer can get access to a URL (web) recorded in the code 30. Reading can be performed, for example, using a dedicated application running on the consumer terminal 51. Therefore, the consumer cannot perceive a physical quantity change only by reading the code 30 and only recognizes the code 30 as a straightforward code in which the URL was recorded. Nevertheless, a physical quantity change is indicated at the URL accessed, e.g., using the dedicated application. This enables the user to perceive properness of quality control in the distribution process of the product.

By virtue of the information processing device 100 and the information processing system 1000, a physical quantity can be determined based on the color of the allochroic cell 21b in the code 30. This enables the customer to self-ascertain the quality of the product with the code 30 displayed thereon.

What is claimed:

1. An information processing system comprising:
    a terminal device having a reader to mechanically read the information in a mechanically readable code, the mechanically readable code comprising:
        a first area comprising multiple first unit cells and including an information region where information was recorded; and
        a second area comprising multiple second unit cells including an allochroic cell that changes in color depending on a physical quantity,
        wherein the multiple first unit cells include transitional color cells having any transitional color in the process of color change of the allochroic cell; and
    an information processing device,
    wherein the information processing device comprising:
    a reception unit that receives the information acquired by the terminal device and color information of the allochroic cell;
    a database that retains relationships including a first relationship between the color of the allochroic cell and a physical quantity and a second relationship between the information and a type of ink to color the allochroic cell; and
    a determination unit that determines the physical quantity to which the code has been exposed, based on the received information, the color of the allochroic cell, and the relationships.

2. An information processing system comprising:
    a terminal device having a reader to mechanically read the information in a mechanically readable code the mechanically readable code comprising:
        a first area comprising multiple first unit cells and including an information region where information was recorded; and
        a second area comprising multiple second unit cells including an allochroic cell that changes in color depending on a physical quantity,
        wherein the multiple first unit cells include transitional color cells having any transitional color in the process of color change of the allochroic cell; and
    an information processing device,
    wherein the information processing device comprising:
    a reception unit that receives the information acquired by the terminal device and image data of the allochroic cell;
    a database that retains relationships including a first relationship between the color of the allochroic cell and a physical quantity and a second relationship between the information or the code and a type of ink to color the allochroic cell; and
    a determination unit that identifies the color of the allochroic cell from received image data of the allochroic cell and determines the physical quantity to which the code has been exposed, based on the received information, the identified color of the allochroic cell, and the relationships.

3. The information system according to claim 1, wherein the physical quantity is an integral physical quantity that is a product of the physical quantity and elapsed time.

4. The information system according to claim 1, wherein the first relationships are retained by each type of ink to color the allochroic cell.

5. An information processing device that processes information recorded in a mechanically readable code characterized by comprising:
    a reception unit that receives information recorded in the code and color information of the allochroic cell or image data of the allochroic cell;
    a database that retains relationships including a first relationship between the color of the allochroic cell and a physical quantity and a second relationship between the information and a type of ink to color the allochroic cell; and
    a determination unit that determines the physical quantity to which the code has been exposed, based on the received information, the color of the allochroic cell, and the relationships;
    wherein the mechanically readable code comprising:
        a first area comprising multiple first unit cells and including an information region where information was recorded; and
        a second area comprising multiple second unit cells including an allochroic cell that changes in color depending on a physical quantity,
        wherein the multiple first unit cells include transitional color cells having any transitional color in the process of color change of the allochroic cell.

* * * * *